US009234086B2

(12) United States Patent
Kim et al.

(10) Patent No.: US 9,234,086 B2
(45) Date of Patent: Jan. 12, 2016

(54) PLASTICIZER COMPOSITION

(71) Applicant: LG CHEM, LTD., Seoul (KR)

(72) Inventors: Hyun Kyu Kim, Daejeon (KR); Sung Shik Eom, Daejeon (KR); Mi Yeon Lee, Daejeon (KR); Dong Hyun Ko, Daejeon (KR); Da Won Jung, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/510,934

(22) Filed: Oct. 9, 2014

(65) Prior Publication Data

US 2015/0025185 A1 Jan. 22, 2015

Related U.S. Application Data

(63) Continuation of application No. PCT/KR2013/005916, filed on Jul. 3, 2013.

(30) Foreign Application Priority Data

Aug. 23, 2012 (KR) ........................ 10-2012-0092362
May 10, 2013 (KR) ........................ 10-2013-0052920

(51) Int. Cl.

*C08L 23/06* (2006.01)
*C08K 5/12* (2006.01)
*C08K 5/06* (2006.01)
*C08K 13/00* (2006.01)
*C08K 5/00* (2006.01)
*C08K 5/04* (2006.01)
*C08K 5/10* (2006.01)
*C08L 101/00* (2006.01)

(52) U.S. Cl.

CPC ................ *C08K 5/12* (2013.01); *C08K 5/0016* (2013.01); *C08K 5/04* (2013.01); *C08K 5/06* (2013.01); *C08K 5/10* (2013.01); *C08K 13/00* (2013.01); *C08L 101/00* (2013.01); *C08K 2201/014* (2013.01)

(58) Field of Classification Search

CPC ............ C08K 5/06; C08K 5/10; C08K 13/00; C08K 2201/014
USPC .......................................................... 524/587
See application file for complete search history.

(56) References Cited

U.S. PATENT DOCUMENTS 2,307,794 A 1/1943 Jordan
2,936,320 A * 5/1960 Benoit, Jr. ........................ 560/76
3,155,715 A * 11/1964 Ardis ...................... C07C 67/08 560/98
3,182,034 A * 5/1965 Hook .................. C08K 5/1515 524/114
3,929,867 A * 12/1975 McCollum ............... C08K 5/12 524/296
4,223,124 A 9/1980 Broughton et al.
4,277,287 A * 7/1981 Frye ......................... 106/287.12
4,600,655 A * 7/1986 Hermann .......... B32B 17/10688 428/428
4,675,434 A * 6/1987 Uhm ....................... C07C 67/08 556/106
4,715,897 A * 12/1987 Tallon .................. C04B 35/532 106/284
4,929,749 A * 5/1990 Gupta et al. .................... 560/79
2007/0038001 A1* 2/2007 Cook ..................... C07C 67/08 560/99
2007/0123622 A1 5/2007 Schaefer
2007/0179229 A1* 8/2007 Grass .................... C07C 29/141 524/287
2008/0058450 A1* 3/2008 Stimpson et al. ............. 524/296
2009/0110937 A1* 4/2009 Onuoha ................ C08G 18/12 428/424.2
2009/0144555 A1* 6/2009 Utin ....................... G06F 21/31 713/184
2010/0093885 A1* 4/2010 Hansel ................ C08K 5/0016 523/100
2010/0292381 A1 11/2010 Kamikawa
2010/0298477 A1* 11/2010 Godwin .................. C08K 5/10 524/285
2011/0307830 A1* 12/2011 Robert et al. ................. 715/810
2013/0315021 A1* 11/2013 Kondo .................. H03K 17/00 365/228
2014/0315021 A1* 10/2014 Naert .................. C09D 127/06 428/394
2014/0336294 A1* 11/2014 Kim ........................ C08K 5/12 521/145
2014/0336320 A1* 11/2014 Lee ......................... C08K 5/12 524/296
2015/0007750 A1* 1/2015 Lee ......................... C08K 5/12 106/287.24
2015/0025186 A1* 1/2015 Kim .................... C08K 5/0016 524/297

FOREIGN PATENT DOCUMENTS

CN 1800245 A 7/2006
CN 101812210 A 8/2010
EP 0736560 A2 10/1996
JP 07331015 A 12/1995
KR 1020110033578 A 4/2001
KR 10-0868194 B1 11/2008
KR 10-0962985 B1 6/2010
KR 10-2010-0098367 A 9/2010
KR 10-20110064890 A 6/2011
KR 10-20130042743 A 4/2013
WO 97-43634 A1 11/1997
WO 99/29778 A1 6/1999
WO 2008/027435 A1 3/2008
WO 2008/140177 A1 11/2008

OTHER PUBLICATIONS

Yongku Kang et al; "Effect of Poly (ethylene glycol) dimethyl ether Plasticizer on Ionic Conductivity of Cross-Linked Poly[siloxane-g-oligo(ethylene oxide)] Solid Polymer Electrolytes"; Macromolecular Research; vol. 12, No. 5, pp. 431-436; Oct. 31, 2004.

* cited by examiner

*Primary Examiner* — Jane L Stanley
(74) *Attorney, Agent, or Firm* — Dentons US LLP

(57) ABSTRACT

Disclosed is a plasticizer composition which comprises an ester-based plasticizer and an ether compound and exhibits improved workability and heat loss in proportion to content of the ether compound.

18 Claims, No Drawings

PLASTICIZER COMPOSITION

This application is a Continuation Bypass Application of International Patent Application No. PCT/KR2013/005916, filed Jul. 3, 2013, and claims the benefit of Korean Patent Application No. 10-2013-0052920 filed on May 10, 2013, and Korean Patent Application No. 10-2012-0092362 filed on Aug. 23, 2012, in the Korean Intellectual Property Office, the disclosures of which are incorporated herein by reference.

TECHNICAL FIELD

The present invention relates to a plasticizer composition. More specifically, the present invention relates to a plasticizer composition which comprises an ester-based plasticizer and an ether compound, and exhibits improved workability and heat loss in proportion to content of the ether compound.

BACKGROUND ART

In general, a plasticizer is prepared by esterification reaction between an acid and an alcohol. Examples of catalysts commonly used for esterification reaction include organometallic compounds including titanium compounds, tin compounds and the like, ion exchange resins, zeolite, heteropolyacids, sulfuric acid, para-toluene sulfonic acid and the like.

There are differences in reaction rate and production of by-products between these catalysts due to characteristics of the respective catalysts. An esterification reaction for plasticizer synthesis is performed using an optimal catalyst selected while taking these points into consideration. This catalyst is selected in view of reaction velocity as well as ease of removal and process stability during purification. In reality, solid catalysts have an advantage in that purification of products through simple filtering is simplified in the purification process and homogeneous catalysts have an advantage of an increased rate of reaction. However, esterification reaction is performed using optimal catalysts selected in consideration of all circumstances.

Recently, upon selection of catalysts, attempts to develop and apply catalysts capable of securing an eco-friendly preparation process are made and research associated therewith is underway.

Catalyst development focuses on increase in rate of reaction, minimization of by-products and simplification of purification processes. There is a need for continuous research, which secures optimal plasticizer synthesis conditions while increasing rate of reaction and preventing effects of by-products on product quality, when various catalysts are used.

DISCLOSURE

Technical Problem

Therefore, the present inventors have completed the present invention through research associated with plasticizers. It is an object of the present invention to provide a plasticizer composition which comprises an ester-based plasticizer and an ether compound and secures physical properties such as workability and heat loss.

Technical Solution

In accordance with an aspect of the present invention, the above and other objects can be accomplished by the provision of a plasticizer composition comprising an ester-based plasticizer and an ether compound, wherein the ether compound is present in an amount of 0.01 to 20% by weight, based on the total weight of the plasticizer composition.

Hereinafter, the present invention will be described in detail.

First, a technical feature of the present invention is to provide a plasticizer composition comprising specific contents of an ester-based plasticizer and an ether compound.

Specifically, the content of the ether compound is 0.01 to 20% by weight, 0.1 to 9.5% by weight, or 1.5 to 6.5% by weight, based on the total weight of the plasticizer composition. Within this range, meltability (workability) and heat loss of the composition can be improved.

A gas chromatography retention time peak of the ether compound is plotted in the middle of a retention time peak of the ester product and a retention time peak of the alcohol according to boiling point and polarity of the ether compound. For reference, when aliphatic and aromatic alcohols having 10 or more carbon atoms are used, retention time is shifted backward, and when aliphatic and aromatic alcohols having 8 or more carbon atoms are used, a retention time is relatively shifted forward. In addition, gas chromatography retention time peak may be changed according to gas chromatography (G.C) analysis conditions.

For example, the ether compound may have a retention time peak at 6.5 minutes to 14 minutes, or at 6.8 minutes to 13 minutes, upon analysis on a HP-5 column and in the presence of helium as a carrier gas using Agilent 7890 GC (model name) as a gas chromatography apparatus.

The ether compound may be derived from the product obtained through esterification reaction, or may be a separately prepared ether compound per se. In addition, the ether compound may have an alkyl group that is the same as or different from an alkyl group of the ester-based plasticizer or an alkyl group of an alcohol added during esterification reaction of the ester-based plasticizer. In a specific example, the ether compound may be selected one or more from an aliphatic compound having a C1-C20 alkyl group, an aromatic compound having a C1-C20 alkyl group, and a compound containing an aliphatic moiety having a C1-C20 alkyl group and an aromatic moiety having a C1-C20 alkyl group.

In another example, the ether compound may be selected from at least one aliphatic compound having a C1-C20 alkyl group, at least one aromatic compound having a C1-C20 alkyl group, and at least one compound containing an aliphatic moiety having a C1-C20 alkyl group and an aromatic moiety having a C1-C20 alkyl group.

Meanwhile, the ester-based plasticizer may have a retention time peak at 15 minutes to 20 minutes, 16 minutes to 19 minutes, or 17 minutes to 19 minutes, upon analysis on an HP-5 column and in the presence of helium as a carrier gas using Agilent 7890 GC (model name) as a gas chromatography apparatus.

The ester-based plasticizer may be derived from the product obtained through esterification reaction of an acid and an alcohol in an esterification catalyst, or may be a separately prepared ether compound per se. In a specific example, the ester-based plasticizer may be selected one or more from an aliphatic compound having a C1-C20 alkyl group, an aromatic compound having a C1-C20 alkyl group, and a compound containing an aliphatic moiety having a C1-C20 alkyl group and an aromatic moiety having a C1-C20 alkyl group.

The acid, for example, may be selected one or more from carboxylic acid such as terephthalic acid, (iso)phthalic acid, phthalic anhydride, hydrocyclic phthalate, succinic acid, citric acid, trimellitic acid, (iso)butyric acid, maleic anhydride, 2-ethylhexanoic acid, benzoic acid, adipic acid and azelic acid, phosphoric acid and phosphorous acid.

For example, the alcohol may be selected one or more from an aliphatic alcohol having a C1-C20 alkyl group and an aromatic alcohol having a C1-C20 alkyl group.

In a specific example, the alcohol may have a retention time peak at 1 to 6.4 minutes or 1 to 6 minutes, upon analysis on an HP-5 column and in the presence of helium as a carrier gas using Agilent 7890 GC (model name) as a gas chromatography apparatus.

In another example, the alcohol may be selected one or more from monovalent to trivalent aliphatic alcohols having a C1-C20 alkyl group and isomers thereof, such as methanol, ethanol, propanol, n-butanol, iso-butanol, tert-butanol, pentanol and isomers thereof, hexanol and isomers thereof, heptanol and isomers thereof, octanol and isomers thereof, nonanol and isomers thereof, decanol and isomers thereof, undecanol and isomers thereof, and dodecanol and isomers thereof, monovalent to trivalent aromatic alcohols having a C1-C20 alkyl group such as phenol, benzyl alcohol and hydroquinone, and aromatic alcohols having a hydrocarbon chain.

In another example, the alcohol may comprise 10 to 40% by weight of an aliphatic or aromatic alcohol having a C3-C4 alkyl group and 90 to 60% by weight of an aliphatic or aromatic alcohol having a C8-C10 alkyl group.

The catalyst, for example, may be selected one or more from acid catalysts such as sulfuric acid, hydrochloric acid, phosphoric acid, nitric acid, paratoluenesulfonic acid, methanesulfonic acid, ethanesulfonic acid, propanesulfonic acid, butanesulfonic acid and alkyl sulfuric acid, metal salts such as aluminum lactate, lithium fluoride, potassium chloride, cesium chloride, calcium chloride, iron chloride and aluminum phosphate, metal oxides such as heterpolyacids, natural/synthetic zeolites, cation and anion exchange resins, and organometallic compounds such as tetraalkyltitanate and polymers thereof.

In a specific example, when at least one sulfonic acid-based catalyst selected from paratoluenesulfonic acid, methanesulfonic acid, ethanesulfonic acid, propanesulfonic acid and butanesulfonic acid is used in liquid form as the catalyst, it is possible to improve rate of reaction and reduce reaction temperature during esterification reaction, inhibit corrosion in a reactor, reduce stickiness and thereby improve handling.

The sulfonic acid-based catalyst may be sequentially or simultaneously used in combination with at least one non-sulfonic acid-based catalyst. The non-sulfonic acid-based catalyst is for example sulfuric acid, hydrochloric acid, phosphoric acid, nitric acid, alkyl sulfuric acid, aluminum lactate, lithium fluoride, potassium chloride, cesium chloride, calcium chloride, iron chloride, aluminum phosphate, metal oxides such as heterpolyacids, natural/synthetic zeolites, cation and anion exchange resins, and tetraalkyl titanate and a polymer thereof. An amount of the used catalyst is for example, for a homogeneous catalyst, 0.001 to 5 parts by weight, based on 100 parts by weight of the acid and, for a heterogeneous catalyst, 5 to 200 parts by weight, based on 100 parts by weight of the acid.

For example, the esterification reaction may be performed at a temperature of 80 to 300° C. using a batch reactor, a mixed flow reactor or a tubular reactor.

In a specific example, the esterification reaction is performed at a temperature of 100 to 300° C. for 2 to 14 hours.

When the reaction temperature is lower than the range defined above, rate of reaction is excessively low and reaction is inefficient, and when the reaction temperature is higher than the range, products are thermally decomposed and color of the product may be degraded. In another example, the reaction temperature is 130 to 280° C. or 130 to 240° C.

In addition, when the reaction time is shorter than the range defined above, reaction is insufficient and conversion ratio and yield may thus be low, and when the reaction time exceeds this range, conversion ratio reaches about a thermodynamically available level and additional reaction may thus be meaningless. In a specific example, the reaction time may be 4.5 to 8 hours.

The esterification reaction may be performed further using an entrainer as a substance which functions to discharge water produced during esterification reaction to the outside of a reaction system. In a specific example, esterification reaction is carried out by feeding 1 to 20 parts by weight of a liquid entrainer or a gas entrainer, with respect to 100 parts by weight of the total esterification reactant at a flow rate of 0.1 to 100 times a reactor volume per hour.

The entrainer may for example be an organic solvent including n-hexane, toluene or xylene, or an inert gas such as nitrogen.

After completion of the esterification reaction, for example, unreacted raw material is removed by distillation under reduced pressure or the like, and is neutralized with a basic solution such as an aqueous solution of NaOH, KOH or $Na_2CO_3$. The neutralized substance is washed with water, is optionally dried by dehydration under reduced pressure and is filtered through an absorbent material.

The plasticizer composition may be obtained by preparing and blending respective components, or may be a mixture blended through esterification of a suitable alcohol mixture with terephthalic acid.

In a specific example, the ether compound may be selected one or more from bis(2-ethylhexyl)ether, butyl(2-ethylhexyl) ether and dibutyl ether.

In another example, the ether compound may be an ether composition comprising 20 to 70% by weight or 40 to 70% by weight of bis(2-ethylhexyl)ether, 10 to 70% by weight or 10 to 50% by weight of butyl(2-ethylhexyl) ether, and 0.1 to 50% by weight or 10 to 20% by weight of dibutyl ether.

In addition, the ester-based plasticizer for example may be selected one or more from terephthalic, phthalic anhydride, citrate, benzoate, adipate, phosphate, phosphite, azelate and trimellitate plasticizers.

In a specific example, the ester-based plasticizer may be a terephthalate plasticizer represented by the following Formula 1:

[Formula 1]

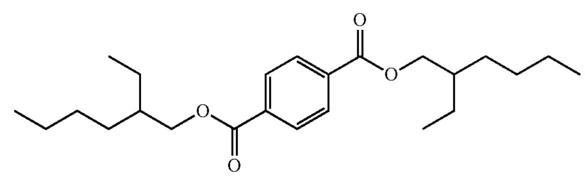

The ester-based plasticizer is for example obtained by the following method including: mixing an alcohol solvent with terephthalic acid; adding a catalyst to the mixture, followed by reaction under a nitrogen atmosphere; removing the unreacted alcohol and neutralizing the unreacted acid; and performing dehydration by distillation under reduced pressure, followed by filtration, to obtain a terephthalate compound.

The alcohol solvent may be a C10 alcohol such as 2-propylheptyl alcohol, a C9 alcohol such as 2-isononyl alcohol, or a C8 alcohol such as 2-ethylhexyl alcohol, and the acid may be terephthalic acid and may be used in combination of carboxylic acid, polycarboxylic acid or an anhydride thereof.

In another example, the ester-based plasticizer may be a plasticizer composition comprising: 20 to 70% by weight of a terephthalate compound represented by the following formula 1; 0.1 to 50% by weight of a terephthalate compound represented by the following formula 2; and 10 to 70% by weight of a terephthalate compound represented by the following formula 3.

[Formula 1]

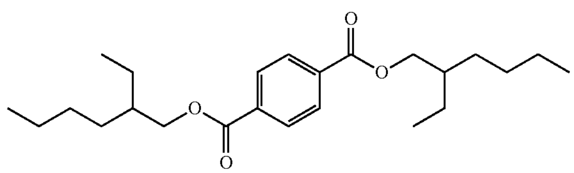

[Formula 2]

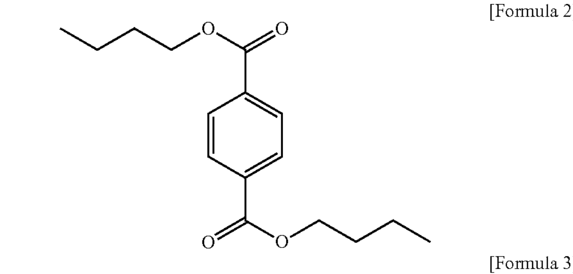

[Formula 3]

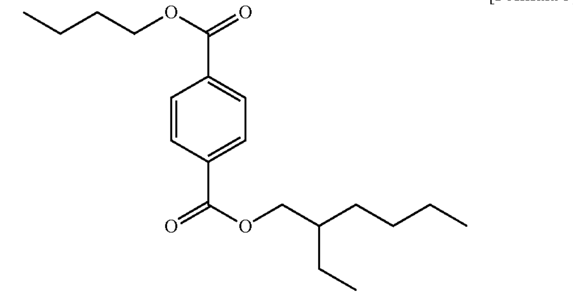

For example, the ester-based plasticizer is for example obtained by the following method including: mixing terephthalic acid in a mixed solvent of alcohol; adding a catalyst to the mixture, followed by reaction under a nitrogen atmosphere; removing the unreacted alcohol and neutralizing the unreacted acid; and performing dehydration by distillation under reduced pressure, followed by filtration, to obtain a terephthalate composition comprising the terephthalate compound represented by Formula 1, the terephthalate compound represented by Formula 2 and the terephthalate compound represented by Formula 3.

In a specific example, the alcohol mixed solvent may comprise 10 to 80% by weight of C3-C4 alcohol such as n-butanol and 90 to 20% by weight of C8-C10 alcohol such as 2-ethylhexyl alcohol, and the acid may be terephthalic acid and may be used in combination of carboxylic acid, polycarboxylic acid or an anhydride thereof. A content ratio of products may be controlled by controlling a molar ratio of the alcohols, and the content ratio of the compounds of Formulas 1, 2 and 3 may be for example a weight ratio of 40 to 70:5 to 10:10 to 50.

The plasticizer composition according to the present invention may be present in an amount of 5 to 150 parts by weight, or 10 to 100 parts by weight, with respect to 100 parts by weight of the resin. The resin for example may be selected one or more from resins such as ethylene vinyl acetate, polyethylene, polypropylene, polyvinyl chloride, polystyrene, polyurethane, thermoplastic elastomers and polylactic acid.

Optionally, the resin composition may further comprise 0.5 to 7 parts by weight of a stabilizer, 0.5 to 3 parts by weight of a lubricant, and at least one additive selected from a plasticizer, a flame retardant, a cross-linking agent and a filler such as carbon black.

The resin composition may be applied by compound prescription or sheet prescription. The resin composition provides heat loss and workability suitable for application to manufacturing of products such as wires, automobile interior materials, sheets or tubes, in proportion to content of ether in the composition.

Advantageous Effects

Advantageously, the present invention provides a plasticizer composition which comprises an ester-based plasticizer and an ether compound and has improved workability and heat loss.

BEST MODE

Now, the present invention will be described in more detail with reference to the following examples. These examples are provided only to illustrate the present invention and should not be construed as limiting the scope and spirit of the present invention.

EXAMPLE 1

332.2 g of terephthalic acid and 781.2 g of 2-ethylhexyl alcohol were added to a 2 liter four-neck round bottom flask equipped with a stirrer, a column for removing produced water and a condenser, 8.1 g of para-toluene sulfonic acid was added thereto, and esterification reaction was performed at an elevated temperature to 200° C. while adding nitrogen thereto at a rate of 100 ml/min to obtain a reaction product.

Total reaction time was about 6 hours and the reaction product was analyzed with a GC-mass spectrometer (Agilent 7890, maintenance at initial temperature of 70° C. for 3 minutes, and then elevation in temperature to 280° C. at a rate of 10° C./min and maintenance for 5 minutes, column: HP-5, carrier gas: helium). As a result, it was identified that the reaction product comprised 3.358% of bis(2-ethylhexyl)ether and 96.642% of a di-2-ethylhexyl terephthalate compound represented by Formula 1.

[Formula 1]

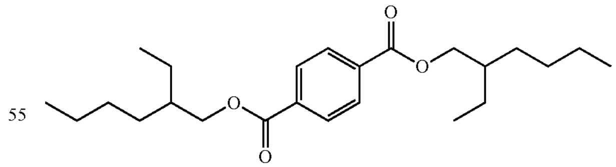

In addition, when the reaction product was analyzed using a gas chromatography apparatus produced by Agilent Technologies (model name: Agilent 7890 GC, column: HP-5, carrier gas: helium), retention time peaks at 5.36 minutes, 10.30 minutes and 18.13 minutes were identified. It was identified that the peak at a retention time of 5.36 minutes corresponds to a peak of the 2-ethylhexyl alcohol used for reaction, and the peak at 18.13 minutes corresponds to a peak of an esterification reaction product produced by esterification reaction. Accordingly, it was identified that the peak at 10.30 minutes corresponds to a peak of an ether compound produced during reaction.

EXAMPLE 2

The same process as in the Example 1 was repeated except that the amount of para-toluenesulfonic acid used was changed to 16.2 g.

The total reaction time was 4.5 hours. As a result of analysis of a reaction product using a GC-mass spectrometer after reaction, it was identified that the reaction product comprised 3.505% of bis(2-ethylhexyl)ether and 96.495% of the di-2-ethylhexyl terephthalate compound of Formula 1.

EXAMPLE 3

The same process as in Example 2 was repeated except that methanesulfonic acid was used, instead of the para-toluenesulfonic acid.

Total reaction time was 10 hours. As a result of analysis of a reaction product using a GC-mass spectrometer, it was identified that the reaction product comprised 6.563% of bis(2-ethylhexyl)ether and 93.437% of the di-2-ethylhexyl terephthalate compound of Formula 1.

EXAMPLE 4

332.2 g of terephthalic acid and 1,300 g of 2-ethylhexyl alcohol were added to a 3 liter four-neck round bottom flask equipped with a stirrer, a column for removing produced water and a condenser, 32.6 g of para-toluene sulfonic acid was added thereto, and esterification reaction was performed at an elevated temperature of 200° C.

Total reaction time was 24 hours. As a result of analysis of a reaction product using a GC-mass spectrometer, it was identified that the reaction product comprised 9.562% of bis(2-ethylhexyl)ether and 90.438% of the di-2-ethylhexyl terephthalate compound represented by Formula 1.

EXAMPLE 5

332.2 g of terephthalic acid and 2,600 g of 2-ethylhexyl alcohol were added to a 5 liter four-neck round bottom flask equipped with a stirrer, a column for removing produced water and a condenser, 65.2 g of para-toluene sulfonic acid was added thereto, and esterification reaction was performed at an elevated temperature of 200° C.

Total reaction time was 24 hours. As a result of analysis of a reaction product using a GC-mass spectrometer, it was identified that the reaction product comprised 17.852% of bis(2-ethylhexyl)ether and 82.148% of the di-2-ethylhexyl terephthalate compound represented by Formula 1.

EXAMPLE 6

The same process as in Example 1 was repeated except that 4.0 g (0.36%) of tetraisopropyl titanate (TiPT) was added, instead of the para-toluenesulfonic acid, reaction was performed for 2 hours and 1% of methanesulfonic acid was further then added.

Total reaction time was about 6 hours. As a result of analysis of a reaction product using a GC-mass spectrometer, it was identified that the reaction product comprised 0.72% of bis (2-ethylhexyl)ether and 99.28% of the di-2-ethylhexyl terephthalate compound represented by Formula 1.

EXAMPLE 7

The same process as in Example 1 was repeated except that 4.0 g (0.36%) of tetraisopropyl titanate (TiPT) was added, instead of the para-toluenesulfonic acid.

Total reaction time was 8 hours. As a result of analysis of a reaction product using a GC-mass spectrometer, it was identified that the reaction product comprised an extremely small amount (lower than 0.01%) of bis(2-ethylhexyl)ether and the balance of the di-2-ethylhexyl terephthalate compound represented by Formula 1. A bis(2-ethylhexyl)ether compound was further added until a concentration of bis(2-ethylhexyl) ether in the final product reached 3.5%.

EXAMPLE 8

The same process as in Example 1 was repeated except that 4.0 g (0.36%) of tetraisopropyl titanate (TiPT) was added, instead of the para-toluenesulfonic acid.

Total reaction time was 8 hours. As a result of analysis of a reaction product using a GC-mass spectrometer, it was identified that the reaction product comprised an extremely small amount (lower than 0.01%) of bis(2-ethylhexyl)ether and the balance of the di-2-ethylhexyl terephthalate compound represented by Formula 1. A bis(2-ethylhexyl)ether compound was further added until a concentration of bis(2-ethylhexyl) ether in the final product reached 6.56%.

EXAMPLE 9

440 g of terephthalic acid, 302 g of n-butanol and 530 g of 2-ethylhexanol were reacted using 32 g of 70% methanesulfonic acid at 140 to 200° C. in a five-neck round bottom flask equipped with a temperature sensor, a mechanical stirrer, a condenser, a decantor and a nitrogen injection apparatus, followed by neutralizing with $Na_2CO_3$, washing with water once, heating under reduced pressure and dealcoholizing, to obtain a reaction product.

Total reaction time was about 5 hours. As a result of analysis of the reaction product using a GC-mass spectrometer, it was identified that the reaction product comprised 3.2% of three types of ethers, i.e., bis(2-ethylhexyl)ether, butyl(2-ethylhexyl)ether and dibutyl ether, and 96.8% of three types of terephthalate compounds represented by the following Formulas 1, 2 and 3.

A weight ratio of bis(2-ethylhexyl)ether, butyl(2-ethylhexyl)ether and dibutyl ether was 60:10:30 and a weight ratio of three terephthalate compounds of the following Formulas 1, 2 and 3 was 40:10:50.

[Formula 1]

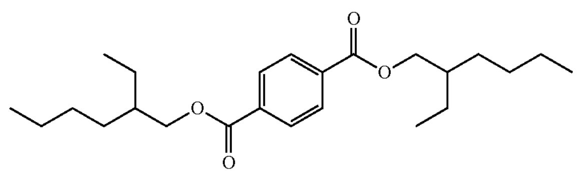

-continued

[Formula 2]

[Formula 3]

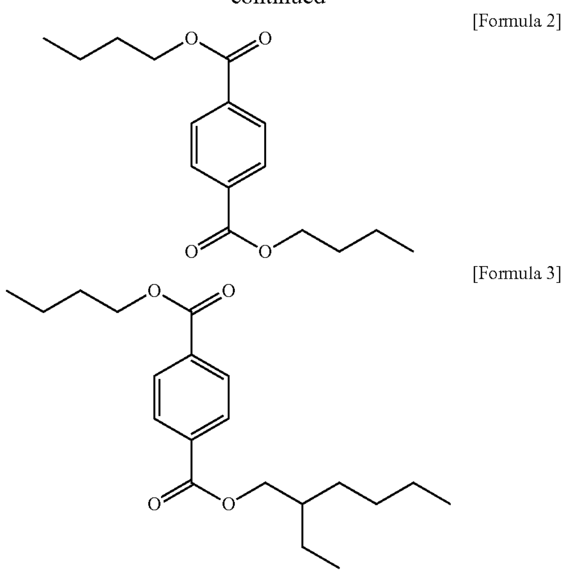

In addition, when the reaction product was analyzed using a gas chromatography apparatus produced by Agilent Technologies (model name: Agilent 7890 GC, column: HP-5, carrier gas: helium), it was identified that retention time peaks at 6.8 minutes, 8.9 minutes and 10.30 minutes correspond to peaks of three types of ether compounds produced during reaction.

EXAMPLE 10

The same process as in the Example 9 was repeated except that the amounts of terephthalic acid, n-butanol and 2-ethylhexanol were changed to 498.3 g, 111.0 g and 976.5 g, respectively, and esterification reaction was performed while slowly elevating temperature from 140° C. to 180° C., to obtain a reaction product.

Total reaction time was about 5 hours. As a result of analysis of the reaction product using a GC-mass spectrometer, it was identified that the reaction product comprises 3.5% of three types of ethers, i.e., bis(2-ethylhexyl)ether, butyl(2-ethylhexyl)ether and dibutyl ether, and 96.5% of three types of terephthalate compounds represented by the following formulas 1, 2 and 3.

A weight ratio of bis(2-ethylhexyl)ether, butyl(2-ethylhexyl)ether and dibutyl ether was 60:10:30 and a weight ratio of three terephthalate compounds of the following formulas 1, 2 and 3 was 19.2:5.1:75.7.

COMPARATIVE EXAMPLE 1

The same process as in Example 1 was repeated except that 4.0 g (0.36%) of tetraisopropyl titanate (TiPT) was added, instead of the para-toluenesulfonic acid, reaction was performed for 2 hours and 1% of methanesulfonic acid was then further added. Total reaction time was 8 hours. It was identified by gas chromatography that the ether compound was present in an extremely small amount lower than 0.01%. It was identified that the extremely small amount of produced ether was bis(2-ethylhexyl)ether.

When the obtained reaction product was analyzed using a gas chromatography apparatus produced by Agilent Technologies (model name: Agilent 7890 GC, column: HP-5, carrier gas: helium), peaks were observed at retention times of 5.36 minutes and 18.13 minutes. It was identified that the peak at a retention time of 5.36 minutes corresponds to a peak of 2-ethylhexyl alcohol used for the reaction, and the peak at 18.13 minutes corresponds to a peak of an esterification product obtained by esterification reaction. These results are consistent with the fact that the ether compound was present in an extremely small amount lower than 0.01%.

COMPARATIVE EXAMPLE 2

The same process as in Example 1 was repeated except that 4.0 g (0.36%) of tetraisopropyl titanate (TiPT) was added instead of the para-toluenesulfonic acid.

Total reaction time was 8 hours. It was identified by gas chromatography that the ether compound was present in an extremely small amount lower than 0.01%. It was identified that the extremely small amount of produced ether was bis(2-ethylhexyl)ether. Bis(2-ethylhexyl)ether was further added such that a content of bis(2-ethylhexyl)ether in the final product was 25%.

Specimens were produced using plasticizer compositions of Examples 1 to 10, and Comparative Examples 1 to 2 and physical properties of specimens were tested. In order to confirm effects of ether content on final product quality, workability was evaluated by absorption velocity (fusion test) and heat loss at a high temperature was measured according to the following method.

<Absorption velocity (Fusion Test, sec)>: a mixer temperature was previously set at 80° C., a predetermined amount of resin was added and mixing was performed for 5 minutes. Then, a predetermined amount of plasticizer was added and a time at which the plasticizer was completely absorbed was measured.

<Heat loss (%) at high temperature>: Products of Examples and Comparative Examples were processed together with resins to produce specimens with a thickness of 1 mm, a loss level was measured at 100° C. for 168 hours and the results are shown in the following Table 1.

TABLE 1

| Items | Absorption velocity (sec) | Heat loss (%) |
|---|---|---|
| Ex. 1 | 143 | 0.48 |
| Ex. 2 | 121 | 0.48 |
| Ex. 3 | 108 | 0.50 |
| Ex. 4 | 96 | 1.05 |
| Ex. 5 | 82 | 3.26 |
| Ex. 6 | 140 | 0.46 |
| Ex. 7 | 125 | 0.50 |
| Ex. 8 | 115 | 0.42 |
| Ex. 9 | 110 | 0.53 |
| Ex. 10 | 88 | 2.56 |
| Comp. Ex. 1 | 145 | 0.48 |
| Comp. Ex. 2 | 75 | Measurement impossible |

As can be seen from Table 1, it was demonstrated that, in Examples 1 to 10, an increase in ether content improved workability (as a result of fusion test).

Meanwhile, it was seen that Examples 1 to 3 and 6 exhibited substantially identical heat loss and Examples 4 and 5 exhibited superior workability, but relatively high heat loss.

In addition, Example 6 in which two different types of catalysts are substantially used provided a suitable range of ether content. Furthermore, it was seen that Examples 7 and 8, in which an ester-based plasticizer and an ether compound are separately blended, provided improvement in heat loss and workability which fall within ranges defined in the present invention.

Meanwhile, Examples 9 and 10 comprising three types of ester-based plasticizers and three types of ether compounds exhibited similar or high absorption velocity in spite of relatively low ether contents, as compared to Example 3. This is thought to be affected by ether containing butanol or alcohol with a low molecular weight.

Meanwhile, Comparative Example 1 having an extremely low ether content exhibited similar heat loss, but poor workability, as compared to Example 1 to 3. This is because an ether content was relatively low, which indicates that ether affects workability.

In addition, in Comparative Example 2 having an ether content exceeding 20% by weight, since the ether compound has a much lower boiling point than an ester compound constituting the ester-based plasticizer, evaporation increases during resin processing, product quality cannot be satisfied to an extent that measurement of heat loss is impossible, and deterioration in weatherability caused by migration and bleeding in the process of obtaining final products may occur.

Consequently, it was demonstrated that, when an ether content is controlled to an optimal level, workability can be improved without affecting heat loss, as compared to products comprising ester only.

The invention claimed is:

1. A plasticizer composition comprising at least one ester-based plasticizer and at least one ether compound, wherein the at least one ether compound is selected from the group consisting of bis(2-ethylhexyl)ether, butyl(2-ethylhexyl) ether and dibutyl ether, and is present in an amount of 0.01 to 20% by weight, based on the total weight of the plasticizer composition.

2. The plasticizer composition according to claim 1, wherein the composition further comprises at least one ether compound selected from the group consisting of an aliphatic compound having a C1-C20 alkyl group, an aromatic compound having a C1-C20 alkyl group, and a compound containing an aliphatic moiety having a C1-C20 alkyl group and an aromatic moiety having a C1-C20 alkyl group.

3. The plasticizer composition according to claim 2, wherein the at least one ether compound has a retention time peak at 6 minutes to 14 minutes, upon analysis on an HP-5 column and in the presence of helium as a carrier gas using Agilent 7890 GC as a gas chromatography apparatus.

4. The plasticizer composition according to claim 1, wherein the at least one ether compound is present in an amount of 0.1 to 9.5% by weight, based on the total weight of the plasticizer composition.

5. The plasticizer composition according to claim 1, wherein the at least one ether compound is obtained by esterification reaction of at least one acid with at least one alcohol and at least one esterification catalyst.

6. The plasticizer composition according to claim 5, wherein the at least one alcohol has a retention time peak at 1 minutes to 6.4 minutes, upon analysis on an HP-5 column and in the presence of helium as a carrier gas using Agilent 7890 GC as a gas chromatography apparatus.

7. The plasticizer composition according to claim 5, wherein the at least one acid is selected from the group consisting of terephthalic acid, (iso)phthalic acid, phthalic anhydride, hydrocyclic phthalate, succinic acid, citric acid, trimellitic acid, (iso)butyric acid, maleic anhydride, 2-ethylhexanoic acid, benzoic acid, adipic acid, azelic acid, phosphoric acid and phosphorous acid.

8. The plasticizer composition according to claim 5, wherein the at least one esterification catalyst is selected from the group consisting of paratoluenesulfonic acid, methanesulfonic acid, ethanesulfonic acid, propanesulfonic acid, butanesulfonic acid, sulfuric acid, hydrochloric acid, phosphoric acid, nitric acid, alkyl sulfuric acid, aluminum lactate, lithium fluoride, potassium chloride, cesium chloride, calcium chloride, iron chloride, aluminum phosphate, heteropolyacids, natural zeolite, synthetic zeolite, cation exchange resins, anion exchange resins and tetraalkyl titanate.

9. The plasticizer composition according to claim 1, wherein the at least one ester-based plasticizer is selected from the group consisting of an aliphatic compound having a C1-C20 alkyl group, an aromatic compound having a C1-C20 alkyl group, and a compound containing an aliphatic moiety having a C1-C20 alkyl group and an aromatic moiety having a C1-C20 alkyl group.

10. The plasticizer composition according to claim 1, wherein the at least one ester-based plasticizer has a retention time peak at 15 minutes to 20 minutes, upon analysis on an HP-5 column and in the presence of helium as a carrier gas using Agilent 7890 GC as a gas chromatography apparatus.

11. The plasticizer composition according to claim 1, wherein the at least one ester-based plasticizer is obtained by esterification reaction of at least one acid with at least one alcohol and at least one esterification catalyst.

12. The plasticizer composition according to claim 11, wherein the at least one alcohol is selected from the group consisting of an aliphatic alcohol having a C1-C20 alkyl group and an aromatic alcohol having a C1-C20 alkyl group.

13. The plasticizer composition according to claim 12, wherein the at least one alcohol comprises 10 to 80% by weight of an aliphatic alcohol or aromatic alcohol having a C3-C4 alkyl group and 90 to 20% by weight of an aliphatic alcohol or aromatic alcohol having a C8-C10 alkyl group.

14. The plasticizer composition according to claim 1, wherein the at least one ester-based plasticizer is selected from the group consisting of terephthalic, phthalic anhydride, citrate, benzoate, adipate, phosphate, phosphite, azelate, and trimellitate plasticizers.

15. The plasticizer composition according to claim 1, wherein the at least one ester-based plasticizer is represented by Formula 1:

(1)

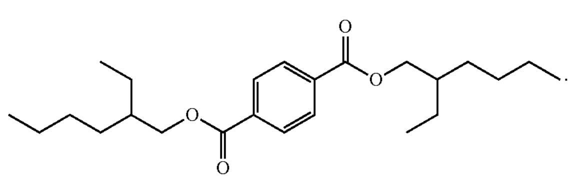

16. The plasticizer composition according to claim 1, wherein the at least one ester-based plasticizer comprises 20 to 70% by weight of the terephthalate compound represented by Formula 1, 0.1 to 50% by weight of the terephthalate compound represented by Formula 2, and 10 to 70% by weight of the terephthalate compound represented by Formula 3:

[Formula 1]

[Formula 2]

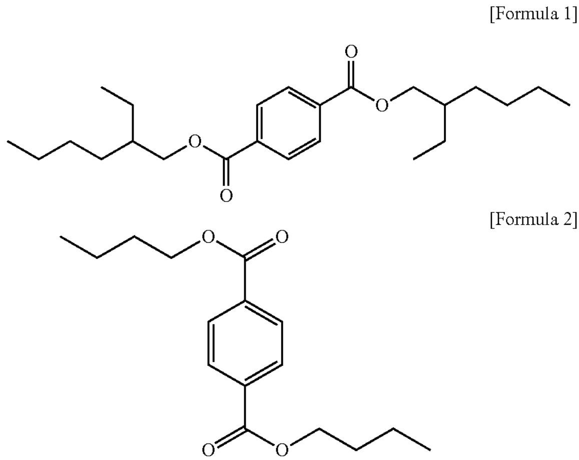

-continued

[Formula 3]

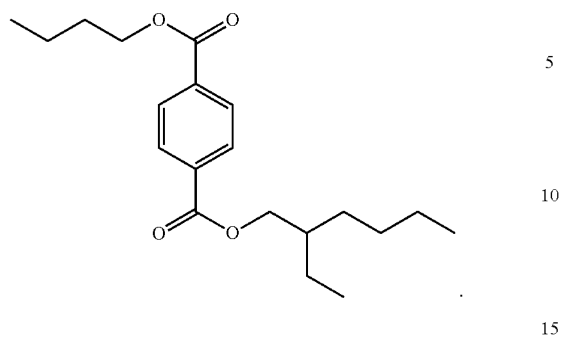

17. The plasticizer composition according to claim 1, wherein the at least one ether compound comprises 20 to 70% by weight of bis(2-ethylhexyl)ether, 10 to 70% by weight of butyl(2-ethylhexyl)ether and 0.1 to 50% by weight of dibutyl ether.

18. A resin composition comprising the plasticizer composition according to claim 1, and at least one resin, wherein the at least one resin is selected from the group consisting of ethylene vinyl acetate, polyethylene, polypropylene, polyvinyl chloride, polystyrene, polyurethane, thermoplastic elastomers and polylactic acid.

* * * * *